United States Patent [19]

Giles

[11] Patent Number: 4,966,382
[45] Date of Patent: Oct. 30, 1990

[54] BICYCLE ACCESSORY FOR CARRYING A SHACKLE

[76] Inventor: Vincent B. Giles, 2910 Shady Hollow W., Boulder, Colo. 80302

[21] Appl. No.: 349,401

[22] Filed: May 8, 1989

[51] Int. Cl.$^5$ ............................................. B62J 11/00
[52] U.S. Cl. ............................... 280/288.4; 224/30 R; 224/32 R; 224/275
[58] Field of Search .......................... 280/288.4, 304.5; 248/309.1, 551; 70/18, 233; 224/30 R, 32 R, 37, 38, 275; D12/114

[56] References Cited

FOREIGN PATENT DOCUMENTS

238079 9/1945 Switzerland ..................... 280/304.5

Primary Examiner—Charles A. Marmor
Assistant Examiner—Alan M. Kagen
Attorney, Agent, or Firm—John R. Flanagan

[57] ABSTRACT

A bicycle accessory for carrying a coiled shackle in which an elongated arm and a mechanism for releasably securing a coiled shackle to the elongated arm are provided. In one embodiment the carrier accessory includes a clip having lower and upper arms which extend outwardly from a mechanism for securing the accessory to a bicycle. In preferred embodiments a hinged lid is attached to the distal end of one of the arms in such a manner that a portion of the hinged lid and a portion of the other arm form a locking system. When a coiled shackle is inserted between the upper and lower arms of the carrier accessory, the arms may then be locked together by the lid to form a closed, and normally tightened carrier accessory for a coiled shackle, with or without a padlock. In another embodiment, the carrier accessory of the present invention includes a lower arm, which extends outwardly from a mechanism for securing the accessory to a bicycle, and a flexible strap which extends above the lower arm. As in the first embodiment, to-be-carried coiled shackle may be placed on the lower arm, followed by the attachment of the strap over the shackle and to the lower arm.

22 Claims, 4 Drawing Sheets

BICYCLE ACCESSORY FOR CARRYING A SHACKLE

BACKGROUND OF THE INVENTION:

(a) Field of the Invention

The present invention relates to an accessory for a wheeled occupant propelled land vehicle, which accessory serves to carry a portable flexible shackle. More specifically it relates to a carrier accessory for holding a coiled shackle, with or without a padlock, on a cycle.

(b) Discussion of the Prior Art

During the past two to three decades great interest has arisen in bicycles as a means of non-polluting transportation and as a source of recreation and exercise. Concomitant with that interest, substantial strides have been made in the engineering and manufacturing of bicycles. As a result, high quality and lightweight multispeed recreational and racing bicycles, rugged trail bicycles, and the like are now quite popular and widely owned. In turn, the cost of these types of bicycles has increased. In another spectrum, many youths have bicycles as their primary source of recreation and transportation, and as their most expensive possession. However, owners of bicycles run a great risk of loss due to bicycle theft if their bicycles are left unattended or unsecured. Therefore most bicycles, when unattended, are secured to a bicycle stand, post, tree, or other fixed object with locks; and with flexible shackles, such as chains and security cables which are secured with padlocks; and with various other locking devices.

Because of its light weight, compactness, and resistance to tampering and cutting, the cable, and especially the helically coiled cable, combined with a padlock, has enjoyed great popularity with the bicycling public for use in securing a bicycle against theft. However, once purchased, the best method for carrying such a chain or cable while the bicycle is being ridden is left to the imagination of the rider. Many riders attach the ends of their chains or cables to the underside of their bicycle seat, or wrap the shackle around the post under the bicycle seat, or around the bicycle frame. Other riders wrap the chain or cable on the handlebars of their bicycles, or carry them separately in a bag or on their person. These methods of carrying a shackle and padlock are either time consuming or awkward, and may pose a potential hazard to the rider or cause damage to the bicycle.

In U.S. Pat. No. 3,756,008 and U.S. Pat. No. 3,886,770 to Smith, there is described a bracket component which is directly connected to and under the bicycle seat, which bracket component is designed to hold a padlock whose shackle in turn supports a self-coiling wire cable. When the padlock and self-coiling wire cable are positioned on the bracket and the bicycle is ridden, the coil is free to move, thereby potentially interfering with the operation of the bicycle or causing damage to the bicycle due to the fact that usually only the ends of the shackle are secured. As a result, the body of the shackle is free to move in such a manner as to potentially interfere with the operation of the bicycle. Also, over time, the wire cable may loses its memory and shape, and stretch in a manner which may cause interference. U.S. Pat. No. 4,490,997 to Hughes et al, Swiss Pat. No. 238,250 to Rickli, PCT Publication W083/00354 of Burnett, and German Pat. No. 132,445 to Herrmann disclose the use of various types of relatively complex and heavy portable bicycle security systems which are permanently attached to a bicycle seat post or frame. Each of these security systems are designed to contain or dispense a security cable or chain. Each of these devices is either quite complicated or quite heavy, and, once attached, cannot be easily removed from the bicycle. For these various reasons, they are somewhat undesirable for use on a bicycle.

Dutch Pat. No. 8300-423 to Lips teaches the use of a "U"-shaped lock with attached chain for securing a bicycle wheel or frame to a stationary object during nonuse of the bicycle. Such a system is heavy, permanently connected to the bicycle, and is not easily carried when the bicycle is being ridden. U.S. Pat. No. 4,126,024 to Timmons et al, U.S. Pat. No. 3,922,894 to Johnson, U.S. Pat. No. 4,024,741 to Arblaster, U.S. Pat. No. 4,023,387 to Gould, U.S. Pat. No. 4,112,720 to Green, and U.S. Pat. No. 4,028,916 to Pender all describe different types of combined bicycle security systems which include a shackle and a lock and a container for carrying and dispensing a shackle and a lock, and a system for attaching such a storage device to a bicycle. Again, each of these devices is either quite complicated or quite heavy, and cannot be easily removed from a bicycle once they are attached, thereby making them somewhat undesirable for use on a bicycle. U.S. Pat. No. 4,284,289 to Loux describes the use of a disk device received around a bicycle seat post for wrapping and holding a security chain or cable thereon. Again, when the chain or cable is positioned on the disk and the bicycle is ridden, the chain or cable is free to move, thereby potentially interfering with the operation of the bicycle or damaging the bicycle.

None of the above-mentioned patents or other known prior art disclose a carrier for attaching a shackle to a bicycle, with or without a padlock, using an accessory carrier system which is simultaneously light weight and quick and efficient to place a coiled shackle on and from which to remove a coiled shackle, while maintaining substantially the entire body of the shackle, with or without a padlock, in a manner and in a position such that the entire body of the shackle is substantially secured against movement, thereby eliminating the potential for the shackle to interfere with the use of the bicycle or to damage the bicycle.

SUMMARY OF THE INVENTION

In view of the foregoing, it is an object of the present invention to provide a carrier accessory for attaching a coiled shackle, with or without a padlock, to a bicycle.

It is another object of the present invention to provide such a carrier accessory for a coiled security cable to a bicycle, which accessory is both light weight and quick and efficient to place a coiled shackle on and from which to remove a coiled shackle.

Another object of the present invention is to provide an accessory carrying system for a coiled security cable, with or without a padlock, which will maintain the cable and any padlock in a manner and in a position such that the cable is substantially secured against movement, thereby eliminating the potential for the cable to interfere with the use or operation of the bicycle or to damage the bicycle.

Yet another object of the present invention is to provide a system which is simple in construction and design and which lends itself to ease of construction, simplicity of attachment to a bicycle, and which is also simple and efficient to use by a bicycle rider.

It is yet another object of the present invention to provide a system for quickly storing a shackle and padlock in a neat, tidy and attractive manner with ready access to both when the bicycle needs to be secured during nonuse.

The foregoing objects of the present invention are obtained by providing a bicycle security shackle carrier accessory which includes a mechanism, such as a clamp to securing it the bicycle. In one preferred embodiment, the carrier accessory of the present invention includes a clip having lower and upper arms which extend outwardly from the securing mechanism. A to-be-carried coiled shackle, with or without a padlock, may be placed on the lower arm, between the upper and lower arms of the accessory, in a manner such that the size of the space between the arms and the cross-sectional dimensions of the shackle hold the coils in place, substantially by force-fit. However, in preferred embodiments a hinged lid is attached to the distal end of one of the arms. In such an embodiment a portion of the hinged lid and a portion of the distal end of the other arm form a locking system. When such a hinged lid is unlocked and moved to an open position the coiled shackle may be inserted between, or removed from between the upper and lower arms of the carrier accessory. When a coiled shackle is inserted between the upper and lower arms of the carrier accessory, the arms may then be locked together by the lid to form a closed, and normally tightened carrier accessory for a coiled shackle, with or without a padlock. With appropriately selected dimensions, when the hinged lid is placed in a closed position and locked the coiled shackle, and any associated padlock, are squeezed between the two arms and thereby substantially secured against movement.

In another preferred embodiment, the carrier accessory of the present invention includes a lower arm, which extends outwardly from a securing mechanism, and a flexible strap which extends above the lower arm. As in the first embodiment, a to-be-carried coiled shackle, with or without a padlock, may be placed on the lower arm, followed by the attachment of the strap over the shackle and to the lower arm. When such an upper strap is detached from the lower arm and moved out of the way, a coiled shackle may be placed on the lower arm of the carrier accessory. When a coiled shackle is placed on the lower arm of the carrier accessory, the strap may then be locked to the lower arm to form a closed carrier accessory, as detailed below.

It is therefore seen that the present invention discloses and provides accessory carrier systems for attaching a shackle, such as a helical coiled security cable, with or without a padlock, to a bicycle. As detailed below, such accessory carrier systems are simultaneously light weight, quick and efficient to operate, yet are capable of carrying and securing a shackle, such as a helical coiled security cable, with or without a padlock. In preferred embodiments, the shackle is carried in a manner and in a position such that it is substantially secured against movement, thereby eliminating the potential for the shackle to interfere with the use of a bicycle or to damage the bicycle.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE DRAWINGS

Figures 1, 2:
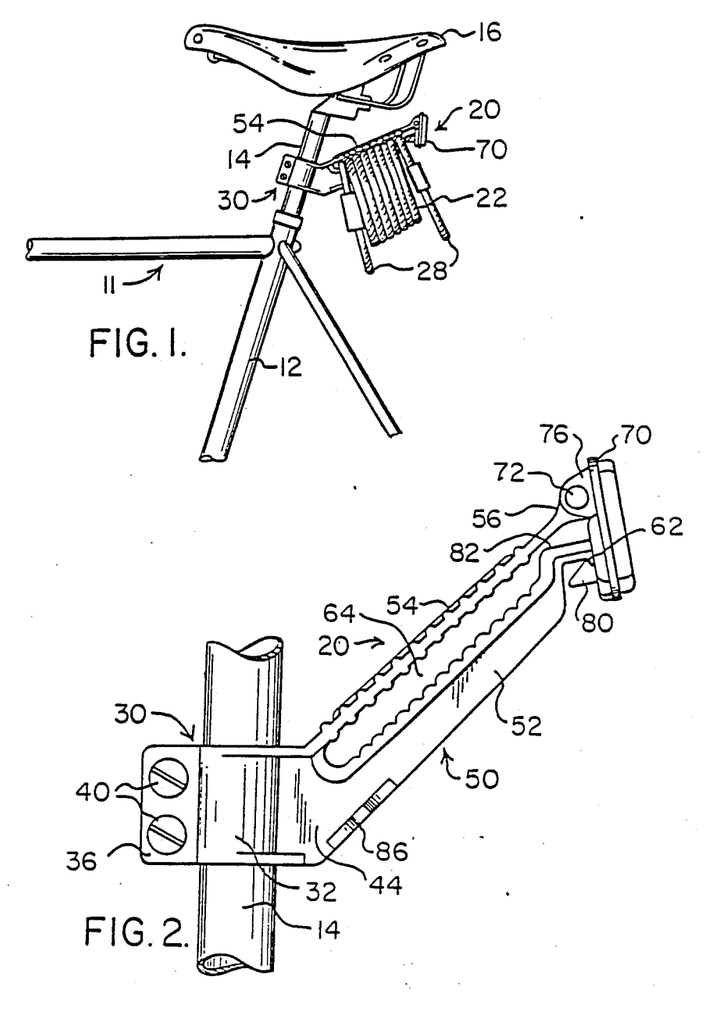
FIG. 1 is an elevational side view of a portion of a bicycle showing one form of the accessory of the present invention for carrying a bicycle shackle mounted on a seat post of a bicycle and carrying a coiled shackle and padlock.
FIG. 2 is an enlarged elevational side view of the accessory of the present invention mounted on the seat post of bicycle, shown broken away, with a hinged lid in a closed and locked position.

In the several FIGS. shown, like reference numbers are used to designate the same parts. Referring to FIG. 1, an elevational side view of a portion of a bicycle 11 is shown having a frame 12 with a seat post 14 secured to the frame 12 and a seat 16 mounted on seat post 14. One preferred embodiment of the subject bicycle security shackle carrier accessory is designated generally by reference number 20, and is shown in greater detail in FIGS. 2 through 8. FIG. 2 shows an enlarged elevational side view of one form of the cable carrier accessory 20 of the present invention mounted on broken away, seat post 14, with carrier accessory 20 extending towards the rear of the bicycle.

Figures 3, 4:
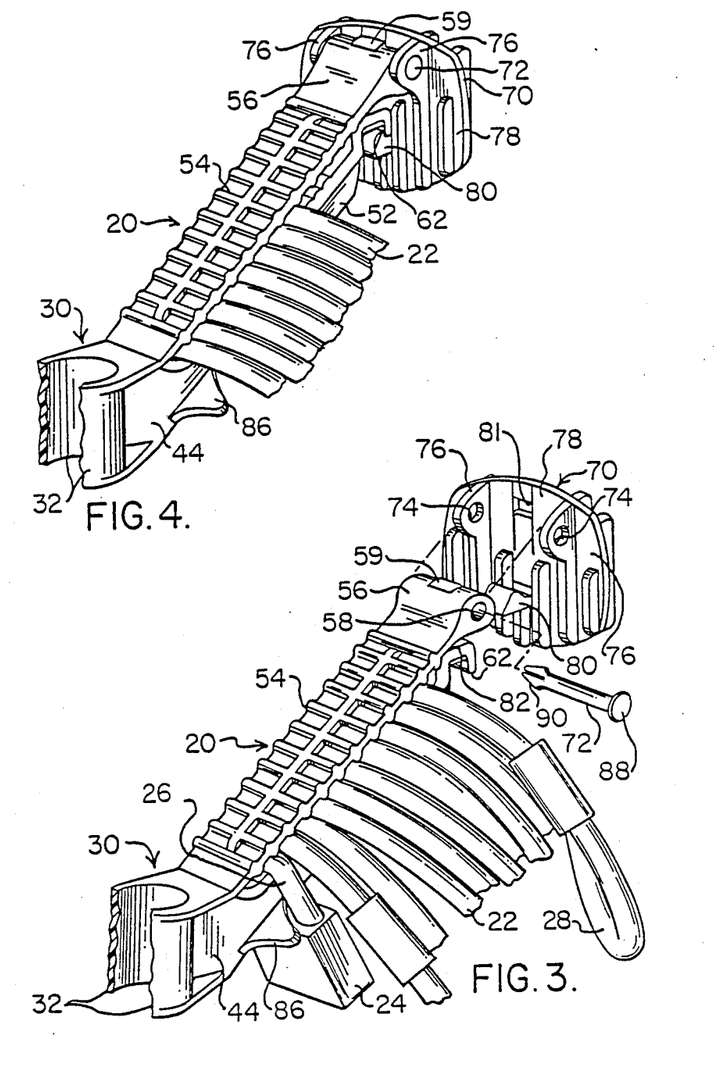
FIG. 3 is an exploded, partially broken away perspective front view of the cable carrier accessory of the present invention, with the coils of a cable and padlock shown broken away.
FIG. 4 is a partially broken away perspective front view of a carrier accessory illustrating the hinged lid in an engaged position, and with a coiled cable secured thereon.
Figures 5, 6, 7, 8:
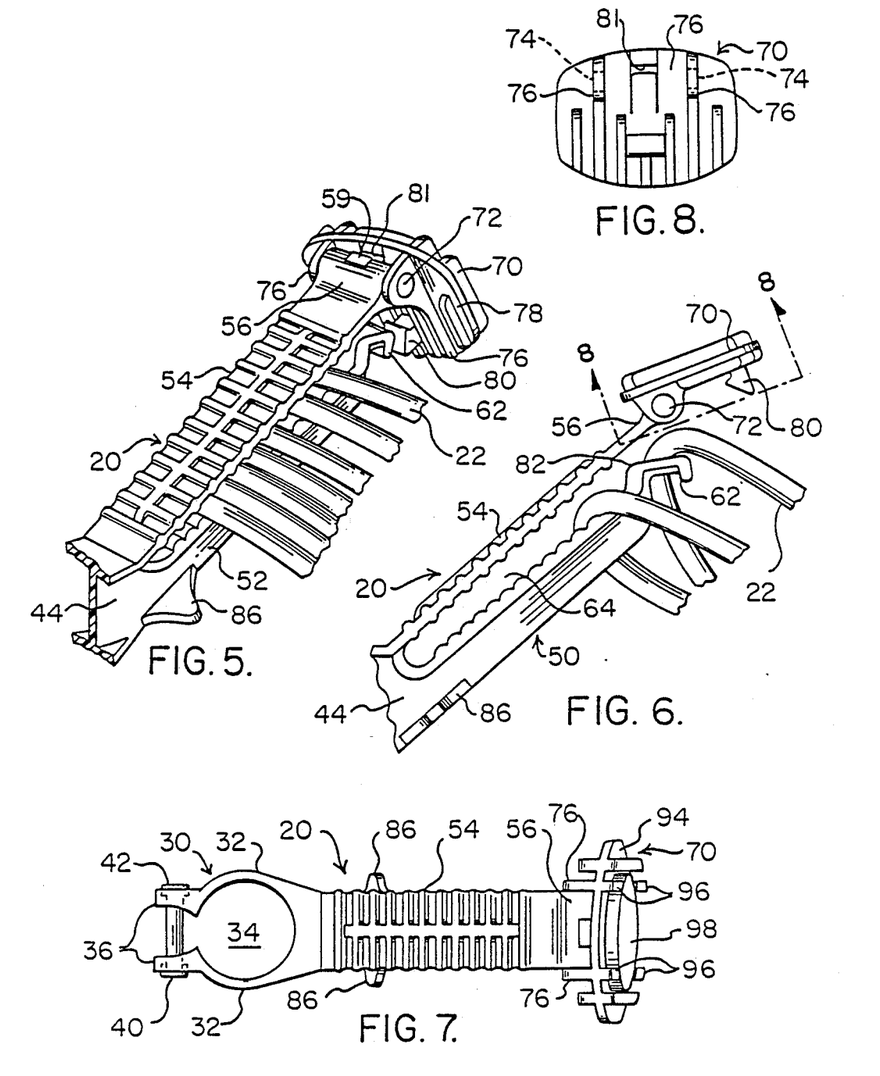
FIG. 5 is a partially broken away perspective front view of the carrier accessory illustrating the hinged lid in a disengaged position, and with a coiled cable loosely held thereby.
FIG. 6 shows a partially broken away side view of the carrier accessory with the hinged lid in a fully opened and stable raised position with a cable being placed upon or being removed from one form of the accessory of the present invention.
FIG. 7 is a top plan view of the carrier accessory of the present invention.
FIG. 8 is an elevational view of the hinged lid taken along lines 8—8 of FIG. 6.

FIGS. 3 through 5 show carrier accessory 20 various modes of use with a coiled shackle 22 and a padlock 24 including a shackle portion 26 carried thereby. The shackle 22 which is illustrated is a helically coiled cable, but other types of coilable shackles may be carried in an improved manner by carrier accessory 20 of the present invention. Shackle 22, as illustrated in FIG. 3 includes eyelets 28 at the opposite ends thereof for receiving padlock 24 therethrough when shackle 22 is used to secure a bicycle frame 11 to a stationary object such as a bicycle stand, post, tree, or the like.

FIGS. 2 and 7 most clearly illustrate accessory security shackle carrier 20 as including a post clamp 30 as one mechanism for attaching carrier accessory 20 to cylindrical seat post 14. Clamp 30 includes two expandable semi-circular arms 32 defining an annular substantially circular opening 34, as shown most clearly in FIG. 7. Circular opening 34 is shaped and designed to receive cylindrical post 14, or some other cylindrical portion of bicycle frame 12 therein. Extended portions 36 of semi-circular arms 32 include apertures, not visible, for receiving threaded bolts 40 therethrough. Each bolt 40 is secured by nut 42, as shown in FIG. 7, which nuts 42 allow the tightening or loosening of clamp 30. For example, with nuts 42 loosened and removed, bolts 40 can then be removed, thereby allowing semicircular arms 32 to be spread apart and expanded to allow post 14 or some other portion of bicycle frame 12 to be received within opening 34. Bolts 40 can then be inserted through the apertures in the extended portions 36 of semi-circular arms 32, connected to nuts 42, and tightened, thus securing the carrier 20 to the seat post 14, or to some other portion of bicycle frame 12. Removal of carrier accessory 20 can be accomplished by reversing these steps.

As most clearly shown by FIGS. 2 and 6, carrier accessory 20 includes a web portion 44 which extends to the left of clamp 30. A clip 50 extends from the right of web portion 44 and slightly upwardly when attached to seat post 14. Clip 50 includes an elongated lower arm 52 which is designed to receive a coiled shackle on its upper surface. Parallel to lower arm 52 is elongated upper arm 54 which terminates in distal end 56, opposed to clamp 30, and having an aperture 58 therethrough, as best shown in FIG. 3. Lower arm 52 is disposed in a parallel spaced relationship from upper arm 54 to define a space 64 there-in-between which is dimensioned to receive the coils of a shackle therein. Web portion 44 and lower and upper arms 52 and 54 forming clip 50 are preferably in the form of an integrally-connected one-piece structure. Preferably, lower and upper arms 52 and 54 extend outwardly in cantilevered fashion from clamp 30 via web portion 44. The upper arm 54 can flex toward and away from lower arm 52. Such flexing permits increase of the height of space 64 between them for facilitating insertion or removal of shackle 22. Referring to FIG. 3, it will be noted that the distal end of upper arm 54 also includes a node or a protrusion 59. Lower arm 52 carries a discontinuity at its distal end which defines a shoulder or keeper 62. As illustrated, it is clear that the clip 50 is angled upwardly from the horizontal a sufficient amount, such that the coils of a shackle can be easily gravity-feed into space 64 of carrier 20.

In the preferred embodiments illustrated by FIGS. 1 through 8, a hinged lid 70 is attached to the upper arm 54 using a hinge pin 72. The pin 72 is received through apertures 74 which are carried by a pair of mounting brackets 76 which are in turn carried by what will be called the backside 78 of hinged lid 70. Also carried by the backside 78 of the lid 70 is a clasp or hook or finger 80 used for releasable locking engagement with shoulder 62 which is carried by lower arm 52. Shoulder 62 and finger 80 are so dimensioned and designed that they snap into locking engagement when the lid 70 is forced to rotate down and into a locked position as shown in FIG. 2 and FIG. 4. Referring to FIG. 3, it will be noted that the rear surface of hinged lid 70 includes a recess 81. When hinged lid 70 is in its fully up position, as illustrated in FIG. 6, node 59 makes a releasable snap fit connection with recess 81, thereby positioning and retaining hinged lid 70 in a stable open position until the user urges it out downwardly, out of that position, for example to close and carrier accessory 20. When lid 70 is not fully open, node 59 rides against the back side of lid 70, much as a cam would guide a cam follower, to thereby urge lid 70 into a somewhat tensioned and stable position along its arc of motion.

A trap or stop 82 is integral with and extends upwardly from the upper surface of lower arm 52. Should lid 70 be inadvertently left open after a coiled shackle is placed into opening 64, as indicated in FIG. 5 and FIG. 6, and the bicycle be ridden with lid 70 unlatched, trap 82 will help to prevent cable 22 from inadvertently bouncing out of carrier accessory 20 and becoming lost. Trap 82 also serves to isolate cable 22 from upper arm 54, thereby preventing the cable from interfering with the closure of hinged lid 70. It should be added, that when inserting the coils of a shackle 22 on and around the lower arm 52 of clip 50 that upper arm 54 is sufficiently flexible that it may be raised slightly, thereby allowing the coils of a shackle to pass over the top of trap 82 so that they may be easily received in space 64.

As illustrated, a pair of outwardly extending ears 86 are attached to opposite sides of lower arm 52. As shown in FIG. 3, when shackle portion 26 of padlock 24 is received at the lower end of space 64, between lower arm 52 and upper arm 54, a portion of padlock shackle 26 rests against ears 86. Ears 86 fix the position of padlock shackle 26, and thus of padlock 24 on the carrier accessory 20 so that padlock 24 is kept away from bicycle frame 12, thereby preventing possible contact of padlock 24 with the frame. Even in the absence of padlock 24, it will be appreciated, for example by reference to FIG. 1 that, by design, carrier 20 carries cable 22 and any padlock 24 upwardly and rearwardly from seat post 14, or any other portion of frame 12 to which it may be attached in a manner and orientation which substantially eliminates any chance of their interfering with the operation of the bicycle.

FIG. 3 illustrates a perspective exploded view of carrier accessory 20 with hinged lid 70 positioned for attachment to distal end 56 of upper arm 54. During attachment of lid 70, aperture 58 through distal end 56 of upper arm 54 is received between the mounting brackets 76, and hinge pin 72 is inserted through the apertures 74 and 58. This results in lid 70 being rotatably connected to the distal end 56 of upper arm 54. Pin 72 is shown to have an enlarged head 88 at one end and a split at the other end which defines a pair of compressible lips 90. Lips 90 can be compressed when inserting them through apertures 74 and 58, and then allowed to expand outward when insertion is completed, in this manner securing pin 72 in place and lid 70 to distal end 56 of upper arm 54.

FIG. 4 shows carrier accessory 20 in a perspective view with hinged lid 70 closed and locked by the action of finger 80 against shoulder 62, and with the coils of cable 22 secured between upper arm 54 and lower arm 52. In preferred embodiments, the spacing between upper arm 54 and lower arm 52 is such, that when a cable of standard diameter is placed there-in-between in space 64, and hinged lid 70 is secured closed and locked, as shown in FIG. 4, cable 22 is actually squeezed by arms 52 and 54, thereby immobilizing cable 22 and securing it in place. While not shown, this will also normally cause some slight bowing of the portion of upper arm 54 which is adjacent to distal end 56.

FIG. 5 shows finger 80 of hinged lid 70 just released from shoulder 62, and the coils of cable 24 released from compression between arms 52 and 54. FIG. 6 illustrates hinged lid 70 in a completely raised and open position with a portion of the coils of cable 22 being either removed from or placed into space 64 of clip 50.

FIG. 7 illustrates a top view of the carrier accessory 20 with a bolt 40 and nut 42 secured to post clamp 30. Also visible in this view is what will be referred to as front side 94 of hinged lid 70. In preferred embodiments front side 94 of hinged lid 70 carries a plurality of stand-off fingers 96 thereon for receiving a light reflector 98 therein. When lid 70 is in a closed position, as shown in FIGS. 1, 2 and 4, reflector 98 is in a substantially vertical position for reflecting light received and reflecting light which is directed at the rear of bicycle 11. Light reflector 98 provides an added safety feature to carrier 20 for the operator of bicycle 11 during night time riding conditions.

FIG. 8 is an elevational view of hinged lid 70 taken along lines 8—8 of FIG. 6, and illustrating the structure and relationship of apertures 74 which are carried by mounting brackets 76 to recess 81.

Figures 9, 10:
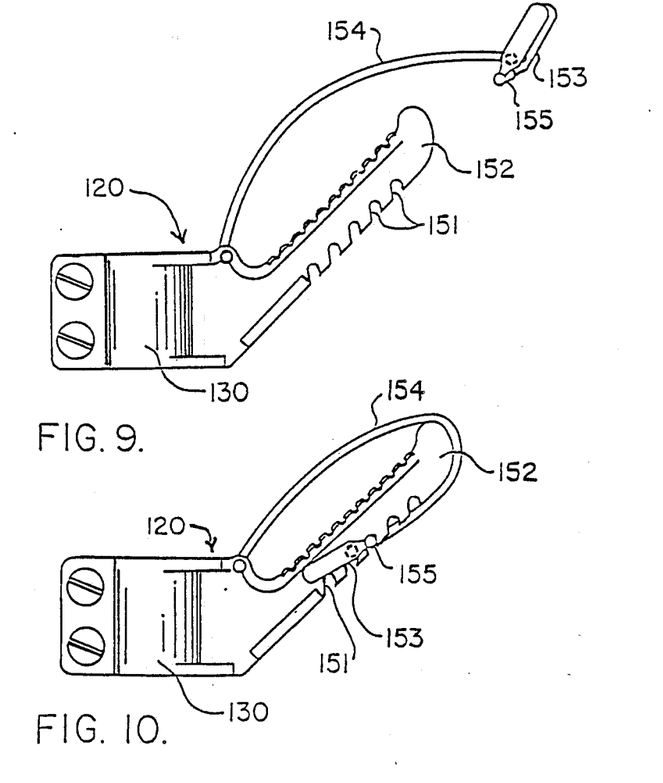
FIG. 9 shows a combined side and isometric view, partially in phantom, of a modified version of a carrier accessory of the present invention in which a flexible elastic strap is provided to secure a shackle to an extended lower arm, with the strap in an open position.
FIG. 10 shows the modified version of carrier accessory shown in FIG. 9 in which the flexible strap is secured to the extended lower arm.

Now, referring to FIGS. 9 and 10, another preferred embodiment, of the carrier accessory of the present invention is shown. In this embodiment like parts have been given like numbers as those used in FIGS. 1-8, but with the addition of 100 thereto. As shown, carrier accessory 120 includes a lower arm 152, which extends outwardly from a clamp 130 securing mechanism, and a flexible strap 154, preferably having elastic characteristics, which extends above lower arm 152. As in the previous embodiment, a to-be-carried coiled shackle, with or without a padlock, may be placed on lower arm 152, followed by the attachment of strap 154 over such a shackle and to lower arm 152. This is accomplished in this embodiment by providing a series of notches 151 in the lower surface of lower arm 152, and further by providing a complex lever arm 153 at the end of strap 154. Complex Lever arm 153 carries a pin 155 between and at substantially right angles to its two sides. The size and shape of notches 151 and of pin 155, as well as the length and elastic properties of strap 154 are such that when strap 154 is placed over coiled shackle 22, and under arm 152, and the body of pin 155 is placed in the furthest notch which it can reach and then rotated forward, as shown in FIG. 10, strap 154 is locked in place to secure shackle 22 against release or movement.

When upper strap 154 is detached from lower arm 152 and moved off of lower arm 152, a coiled shackle 22 may be placed on or removed from the lower arm of carrier accessory 120. When a coiled shackle is placed on the lower arm 152 of carrier accessory 120, strap 154 may then be locked to lower arm 152 to form a closed, and normally tight carrier accessory for a coiled shackle, with or without a padlock.

While carrier accessories 20 and 120 are shown, for example in FIGS. 1 and 2, as being attached to seat post 14, it should be kept in mind that carrier accessory 20 can serve its function of carrying a shackle equally well when attached to other portions of a bicycle, or on equivalent types of equipment or vehicles requiring the use of a security shackle. As previously noted, carrier accessory 20 is adapted for holding either the coils of any flexible shackle, including chains or cables, and also various lock structures, such as padlocks, either separately or in combination. Carrier accessories 20 and 120 may be made of a variety of materials, including but not limited to thermoplastic materials. If produced of thermoplastic, the carrier accessory is designed so that it may be easily injection molded for mass production.

It has therefore been shown that the present invention provides a carrier accessory for attaching a coiled shackle, with or without a padlock, to a bicycle, which accessory is both light weight and quick and efficient to place a coiled shackle on and from which to remove a coiled shackle. Furthermore, it provides such an accessory carrying system for a coiled security cable, with or without a padlock, which will maintain the cable and any padlock in a manner and in a position such that the cable is substantially secured against movement, thereby eliminating the potential for the cable to interfere with the use or operation of the bicycle or to damage the bicycle. The system so provided is simple in construction and design and lends itself to ease of construction, simplicity of attachment to a bicycle, and is also simple and efficient for a bicycle rider to use for quickly storing a shackle and padlock in a neat, tidy and attractive manner with ready access to both when the bicycle needs to be secured during nonuse.

It is clear that the present invention is well adapted to carry out the objects and to attain the ends and advantages mentioned herein as well as those inherent in the invention. While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

What is claimed is:

1. A bicycle accessory comprising in combination:
   means for attaching the accessory to a bicycle;
   means for carrying a coiled shackle, said coiled shackle carrying means connected to and carried by said attaching means, said coiled shackle carrying means including a first elongated arm, said first elongated arm including an upper surface positioned and adapted to receive and carry a coiled shackle, a first end proximal to said attaching means, and a second end opposed to said first end and distal to said attaching means; and
   means for releasably securing a coiled shackle to said upper surface of said fist elongated arm, said coiled shackle securing means connected to and carried by said attaching means and including a second elongated arm extending substantially along, but spaced above, said first elongated arm to form therewith a clip adapted to receive and secure a coiled shackle between said first and second elongated arms, said second elongated arm including a first end proximal to said attaching means, a second end opposed to said first end and distal to said attaching means, and a lower surface positioned and adapted to press and secure a coiled shackle against said upper surface of said first elongated arm.

2. The accessory of claim 1 further including means for blocking inadvertent removal of a coiled shackle from between said first elongated arm and said second elongated arm.

3. The accessory of claim 2 wherein said means for blocking inadvertent removal of a coiled shackle from between said first elongated arm and said second elongated arm includes a projection which is carried by said first arm and extends upwardly for a distance sufficient to substantially block inadvertent removal of a coiled shackle from said first elongated arm.

4. The accessory of claim 3 further including a lid, said lid swingably connected to said distal end of one of said arms and adapted to engage and secure a portion of said other arm when said lid is in a closed position.

5. The accessory of claim 4 wherein said lid is swingably connected to said distal end of said upper arm and lockingly engages a portion of said lower arm.

6. The accessory of claim 4 wherein said lid is swingably connected to the distal end of said upper arm.

7. The accessory of claim 1 wherein the securing engagement of said lid with the other arm is by means of a finger on one of said lid and other arm which engages a shoulder on the other of said lid and other arm.

8. The accessory of claim 7 wherein said finger is carried by said lid and said shoulder is defined in and carried by said lower arm.

9. The accessory of claim 4 wherein said lid and said arm to which said lid is connected carry cooperative means which are adapted to retain said lid in a stable position when said lid is opened an amount sufficient to allow a coiled shackle to be placed between or removed from between said arms.

10. The accessory of claim 9 wherein said distal end of said arm carries a node and said lid defines a recess which is positioned to received said node in a stable position, thereby retaining said lid in an open and stable position when said lid is positioned to receive said node within said recess.

11. The accessory of claim 4, wherein said lid carries a light reflector on its rear surface.

12. The accessory of claim 1 further including an ear extending laterally from each side of said first arm for a distance which is substantially sufficient to block a lock placed on said first arm from moving towards said attaching means, or towards the bicycle to which said accessory is attached.

13. The accessory of claim 1 wherein said means for attaching said accessory to a bicycle is a clamp which is adapted to releasably engage a portion of a bicycle.

14. A bicycle accessory comprising in combination:
means for attaching the accessory to a bicycle;
means for carrying a coiled shackle, said coiled shackle carrying means connected to and carried by said attaching means, said coiled shackle carrying means including a first elongated arm, said first elongated arm including an upper surface positioned and adapted to receive and carry a coiled shackle, a first end proximal to said attaching means, and a second end opposed to said first end and distal to said attaching means; and
means for releasably securing a coiled shackle to said upper surface of said first elongated arm, said coiled shackle securing means including a flexible strap extending substantially parallel to, but spaced from, said first elongated arm to form therewith a clamp adapted to secure a coiled shackle carried by said first elongated arm, said flexible strap including a first end proximal to said means for attaching the accessory to a bicycle, a second end opposed to said first end and distal to said attaching means, and means for securing said distal end of said strap to said first arm.

15. The accessory of claim 14, wherein said first elongated arm includes a lower surface, and said lower surface includes means for receiving said means for securing said distal end of said strap to said first arm.

16. The accessory of claim 15 wherein said means which are included in said lower surface for receiving said means for securing said distal end of said strap to said first arm includes at least one groove, and wherein said means for securing said distal end of said strap to said first arm is a pin which is adapted to be secured by said groove.

17. A bicycle accessory comprising in combination:
means for attaching the accessory to a bicycle;
means for carrying a coiled shackle, said coiled shackle carrying means connected to and carried by said attaching means, said coiled shackle carrying means including a first elongated arm, said first elongated arm including an upper surface positioned and adapted to receive and carry a coiled shackle, a first end proximal to said attaching means, and a second end opposed to said first end and distal to said attaching means; and
a second elongated arm for releasably securing a coiled shackle to said upper surface of said first elongated arm, said second elongated arm being substantially parallel to, but spaced from said first elongated arm to form therewith a clip adapted to secure a coiled shackle, said second arm including a first end proximal to said attaching means, a second end opposed to said first end and distal to said attaching means, and a lower surface positioned and adapted to press and secure a coiled shackle against said upper surface of said first elongated arm; wherein, when said accessory is mounted on a bicycle said first arm extends outwardly from the bicycle on which it is mounted, and at least slightly upwardly from the horizontal so that when the coils of a coiled shackle are between said second and first arms they are substantially stable due to the effects of gravity thereon.

18. The accessory of claim 17 wherein said arms include means for preventing escape of a coiled security shackle from said lower arm.

19. The accessory of claim 18 wherein the spacing between said arms is adapted, as a function of the anticipated cross section dimension of the shackle, as a means for preventing escape of a coiled security shackle from said accessory.

20. A bicycle accessory comprising in combination:
means for attaching the accessory to a bicycle;
means for carrying a coiled shackle, said coiled shackle carrying means connected to and carried by said attaching means, said coiled shackle carrying means including a first elongated arm, said first elongated arm including an upper surface positioned and adapted to receive and carry a coiled shackle, a first end proximal to said attaching means, and a second end opposed to said first end and distal to said attaching means; and
a flexible strap for releasably securing a coiled shackle to said upper surface of said first elongated arm, wherein said flexible strap is substantially parallel to, but spaced from said first elongated arm to form therewith a clamp adapted to secure a coiled shackle carried by said first elongated arm, said flexible strap including a first end proximal to said means for attaching the accessory to a bicycle, and a second end opposed to said first end and distal to said attaching means, and means for securing said distal end of said strap to said first arm.

21. A bicycle accessory comprising in combination: means for attaching said accessory to a bicycle; a clip for carrying and securing a shackle, said clip connected to and carried by said attaching means, said clip including a lower arm with an upper surface adapted to support a shackle and an upper arm with a lower surface, and means for releasably clamping said upper arm toward said lower arm to secure the shackle to said upper surface of said lower arm.

22. A bicycle accessory comprising in combination:
a clamp for attaching the accessory to a bicycle;
a clip for carrying a coiled shackle, said clip extending outwardly from said clamp in a cantilevered fashion and including first and second elongated arms each having inner and outer ends, said arms being sufficiently spaced apart to receive the coiled shackle therebetween and being rigidly attached at their inner ends to said clamp such that said clamp and said arms of said clip form an integrally connected one-piece structure;

said first elongated arm having an upper surface positioned and adapted to receive and carry the coiled shackle, said second elongated arm being capable of flexing toward and away from said first arm correspondingly to press and secure the coiled shackle against the upper surface of said first arm and to increase the space between said arms for facilitating insertion and removal of the coiled shackle; and a locking lid hingedly connected to said outer end of said second arm and releasably latchable to said outer end of said first arm, said lid being swingably movable between a closed position in which said lid is latched to said outer end of said first arm and blocks entry and exit to and from the space between said first and second arms and an opened position in which said lid is unlatched from said outer end of said first arm and unblocks entry and exit to and from the space between said first and second arms.

* * * * *